Jan. 2, 1968     A. E. TRAVER     3,361,280
PANEL SETTING VEHICLE

Filed April 24, 1964     5 Sheets-Sheet 1

FIG___1

ARTHUR E. TRAVER
*INVENTOR.*

BY *Seed & Berry*

*ATTORNEYS*

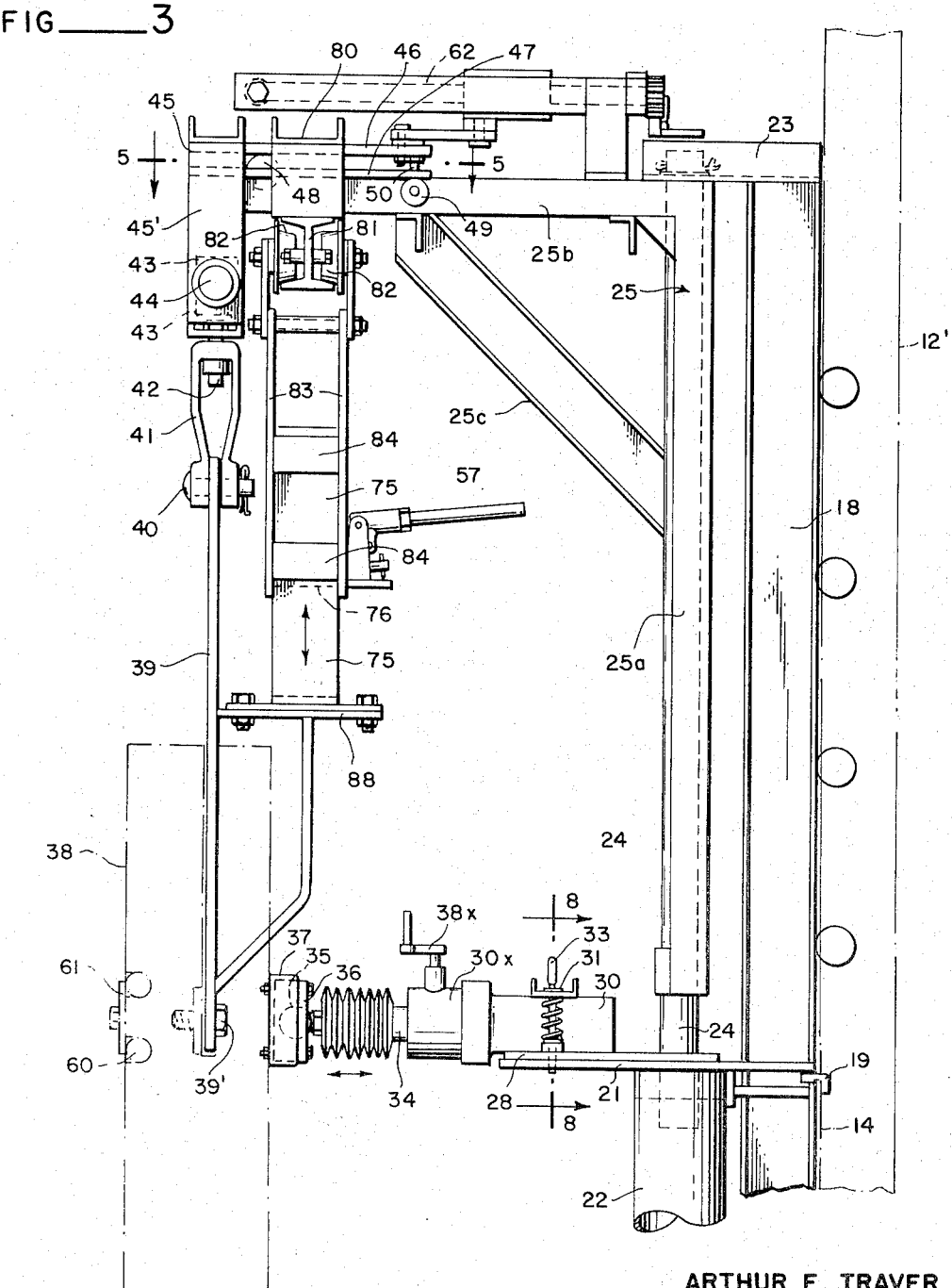

Jan. 2, 1968  A. E. TRAVER  3,361,280
PANEL SETTING VEHICLE
Filed April 24, 1964  5 Sheets-Sheet 4
FIG.___4
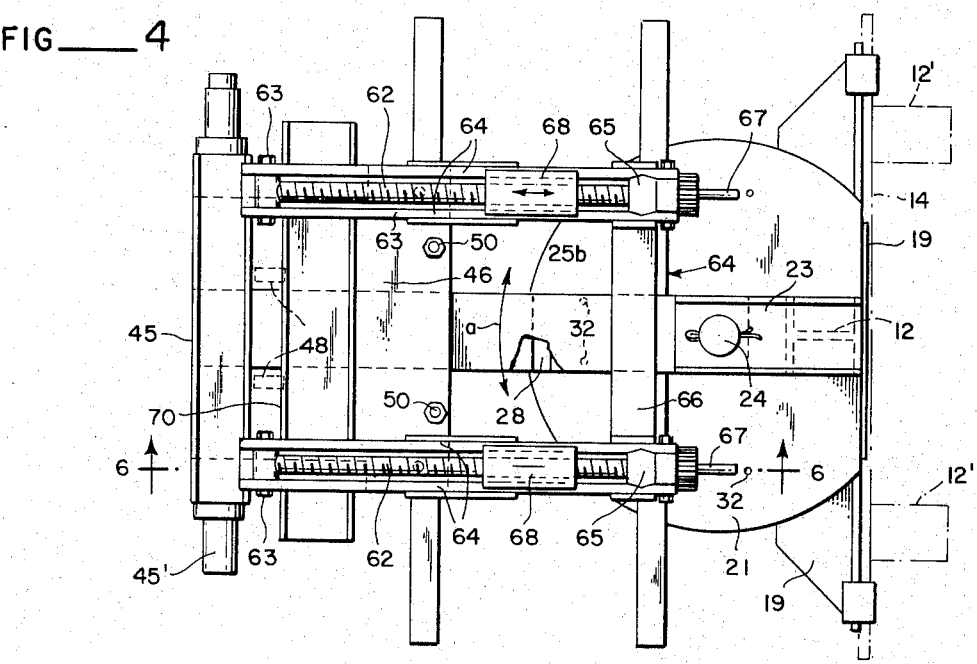
FIG.___5
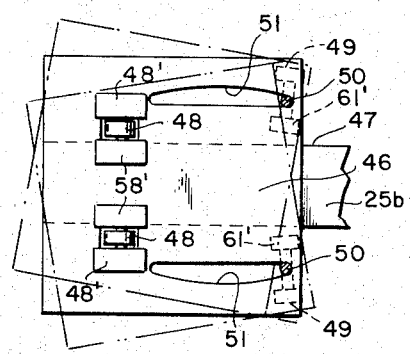
FIG.___6
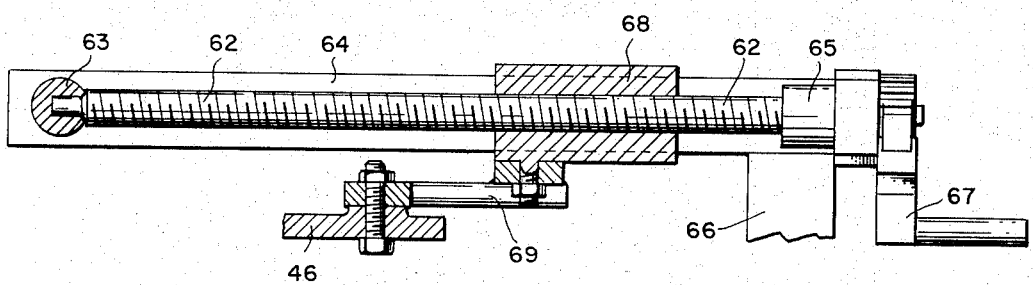
ARTHUR E. TRAVER
INVENTOR.
BY *Seed & Berry*
ATTORNEYS Jan. 2, 1968      A. E. TRAVER      3,361,280
PANEL SETTING VEHICLE
Filed April 24, 1964      5 Sheets-Sheet 5
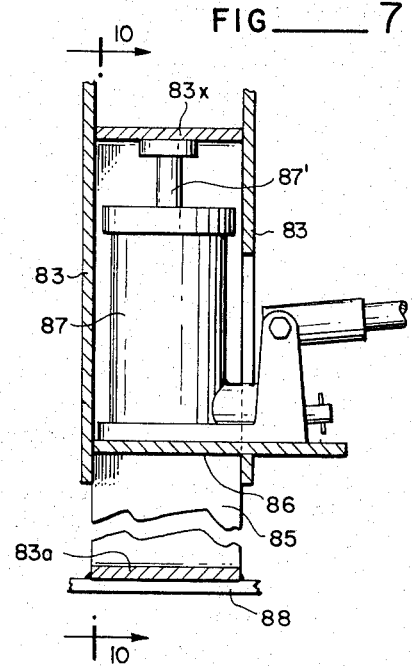
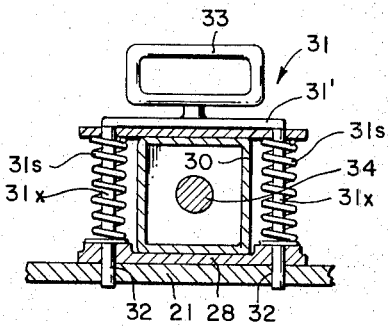
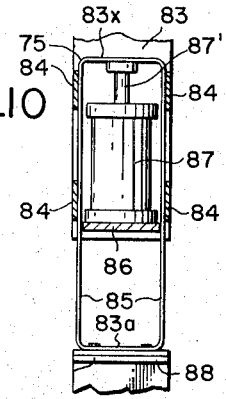
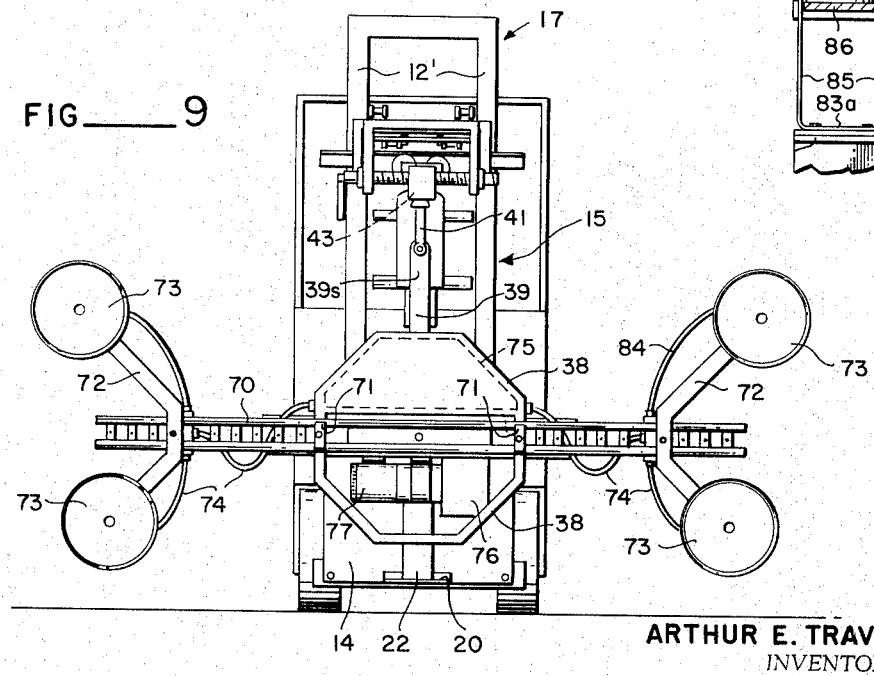
ARTHUR E. TRAVER
*INVENTOR.*
BY *Seed & Berry*
ATTORNEYS United States Patent Office 3,361,280
Patented Jan. 2, 1968

3,361,280
PANEL SETTING VEHICLE
Arthur E. Traver, 1132½ 30th NE.,
Seattle, Wash. 98105
Filed Apr. 24, 1964, Ser. No. 362,362
7 Claims. (Cl. 214—650)

This invention relates to a machine embodying a combination comprising a wheeled industrial truck of fork lift character and various novel article holding mechanisms whereby the machine is adapted for the pick-up, handling, moving and setting of large and usually heavy panes of glass, metal plates, panels and the like, as used extensively in present day building constructions.

More particularly, this invention relates to the above novel combination of devices, including as one of its principal elements, a device now known in trade as a "Strato-Vacuum" plate lifter, which embodies an arrangement of vacuum cups, mounted adjustably on a supporting frame that is applied to said industrial truck, for the picking up, holding, and placing of an individual pane of glass or the like, in an opening prepared to receive it, as for example, an opening as provided by a window frame applied to a store front; in a partition or in a wall, and for holding said pane properly "set" preparatory to and during its safe securement in the opening.

It is the principal object of this invention to provide a machine of the above stated character that is practical, useful and especially economical for the handling and setting of glass panes that are large in size and of such weight as to require exceedingly careful handling.

It is a further object of the invention to provide a mechanism provided with a novel arrangement and use of a plate lifter of the kind above stated and as adjustably applied to a carrier frame mounted by the motorized truck, whereby a heavy pane or panel may be lifted, held secure and moved from or to its place and position of installation and, in the event of its being a "pane setting operation" may be tilted, turned, adjusted up or down, shifted laterally or otherwise angled, as may be required for its accurate placement in a frame opening and then may be held safely and securely during the operation of its permanent securement.

A further object of the invention is to provide the carrier truck with a high lift mast, thus to adapt the combined mechanisms for the setting of a pane or panel in an opening at a higher level than that on which the truck is operated.

Still further objects and advantages of the invention reside in the various means embodied in the combination disclosed for effecting any and all of the necessary adjustments required for bringing a supported pane or panel to the exact position required for its proper setting and securement in the frame opening or space provided therefor, or its removal from an opening.

In accomplishing the above mentioned and other objects, I have provided the improved details of construction, and combination of parts, as illustrated in the accompanying drawings, wherein—

FIG. 3 is a side view of those mechanisms shown in FIG. 2.

FIG. 4 is a top or plan view of the mechanisms shown in FIG. 2.

FIG. 5 is a horizontal section, taken on line 5—5 in FIG. 3.

FIG. 6 is an enlarged, vertical section taken on line 6—6 in FIG. 4.

FIG. 7 is an enlarged, vertical section, taken on line 7—7 in FIG. 2, showing the disposition of the hydraulic jack means for adjustably lifting the vacuum cup mounting unit.

FIG. 8 is a vertical section, taken on line 8—8 in FIG. 3, showing the adjustment holding clamp.

FIG. 9 is a front elevation of the panel holding vacuum cup unit as associated with the various adjusting devices and as supported by the carrier truck.

FIG. 10 is a sectional detail taken on line 10—10 in FIG. 7, showing the manner of mounting the hydraulic jack.

Figure 1:
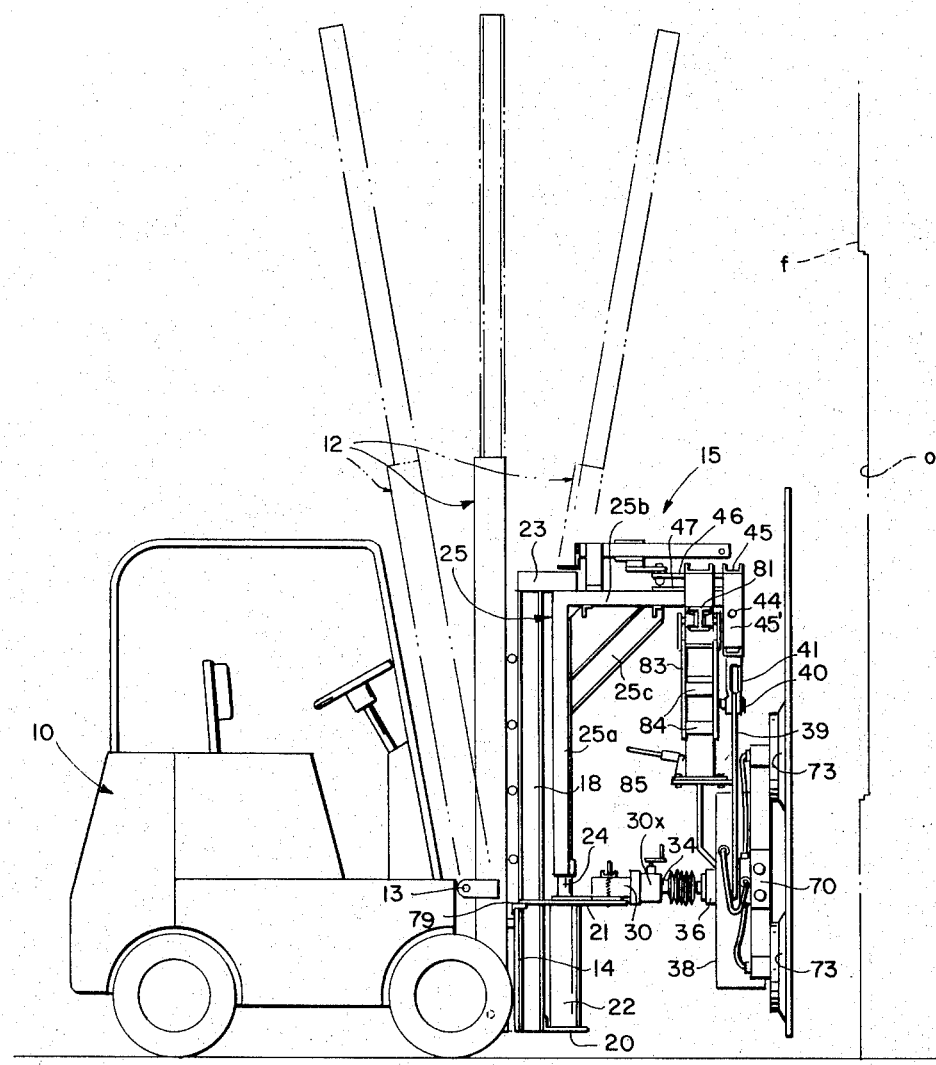
FIG. 1 is a side elevation of the present combination as provided for the pick-up, moving and setting of large glass panes or panels; employing in said combination an industrial truck and a vacuum pane pick-up means.

Referring more in detail to the drawings:

In the combination of various devices and mechanisms, as shown in FIGS. 1 and 9, 10 designates, in its entirety, a certain type of motorized industrial truck equipped at its forward end with a mast structure 12 that is pivotally supported near its lower end on a horizontal axial shaft 13 carried by the truck frame; the truck being equipped with conventional means, not herein shown, for a controlled forward and rearward tilting adjustment of the mast, as indicated in FIG. 1 by its dash line showings.

Mounted for up and down travel on the mast structure 12, is a transversely supported and vertically disposed plate 14 and it is to this plate that the herein featured vacuum cup unit including its various mechanisms for the pick-up, holding and adjusting of a large glass pane or panel, is fixed as has been shown in FIG. 1, wherein this particular pane lifting unit or combination of parts is designated in its entirety by reference numeral 15.

It has been shown in FIGS. 1 and 9, that the mast structure herein designed by numeral 12 is in the nature of an upright frame including paired, vertically extending, laterally spaced opposite side beams 12'—12' which have their lower end portions pivotally supported for mast tilting on the cross-shaft 13. Between the two opposite side beams 12'—12' the mast is equipped with a conventional hydraulic and chain lift mechanism, not herein illustrated, that is operable under control of the truck operation, for effecting the controlled up and down lifting and lowering movements of the plate 14 along the mast 12 to raise or lower the unit 15 supported thereon accordingly.

The mechanism, which in FIG. 1, has been designated in its entirety by reference numeral 15, includes as its main supporting element, an upright I-beam post 18 that has the back face of its lower end portion disposed flatly against and firmly fixed to the plate 14 medially of its opposite end edges, as seen in FIGS. 1 and 9, for its up and down movements in accordance with the up and down adjustments of plate 14 and tilting of the mast.

Fixed horizontally to and extending forwardly from the lower end of the post 18 is a flanged bracket forming bar 20. Likewise, supported horizontally from and across the top edge portion of plate 14 by means of an angle bar 19, is a circularly formed disc or plate 21, well shown in FIG. 4. Supported at its ends by and between the bar 20 and plate 21, immediately forward of post 18, is a short tubular column 22, shown in FIGS. 1 and 3. Also, at the top end of the post 18, a short forwardly and horizontal extending channel bar 23 is secured. Supported at its upper and lower ends by and between the disc 21 and bar 23 is a vertical shaft 24 which mounts thereon a jib crane structure 25, as best shown in FIGS. 1 and 3, which comprises a vertical mast 25a, which, at its top end, has a horizontal jib 25b extending forwardly therefrom, this arm being braced for support from mast 25a by a diagonal strut 25c.

Mounted flatly on the top surface of disc 21 and extending radially forward thereon as in FIG. 3 is a plate 28, which at its inner end, is mounted for the arcuate swinging of the plate about the axial center of shaft 24. Plate 28 terminates at its outer end at the periphery of disc 21, as shown in FIG. 3, and it mounts thereon, in its longitudinal central plane, a housing 30 of rectangular or square cross-sectional shape, as seen in FIG. 8. This housing, as mounted on plate 28m extends radially of the disc 21 and it may be moved with plate 28 to different angular positions and releasably held at any of its positions of adjustment by means of a spring loaded clamp 31 applied thereover as shown in FIG. 8 and to the plate 28 and disc 21.

The clamp, as shown in FIG. 8, comprises a cross-bar 31′ that is extended across the housing 30 and which, at its opposite ends, is equipped with a pair of mounting legs 31x—31x embracing the housing and which mount coil springs 31s thereon. These legs may be projected by the springs downwardly through holes 32 formed in the plate 28 and disc 21 thus to hold the housing 30 and its supporting plate at any selected radially extending position.

A handle 33 is applied to the cross-bar 31′ for lifting and releasing the legs of the clamp 31 from holding position, to permit the arcuate adjustment of housing 30.

Figure 2:
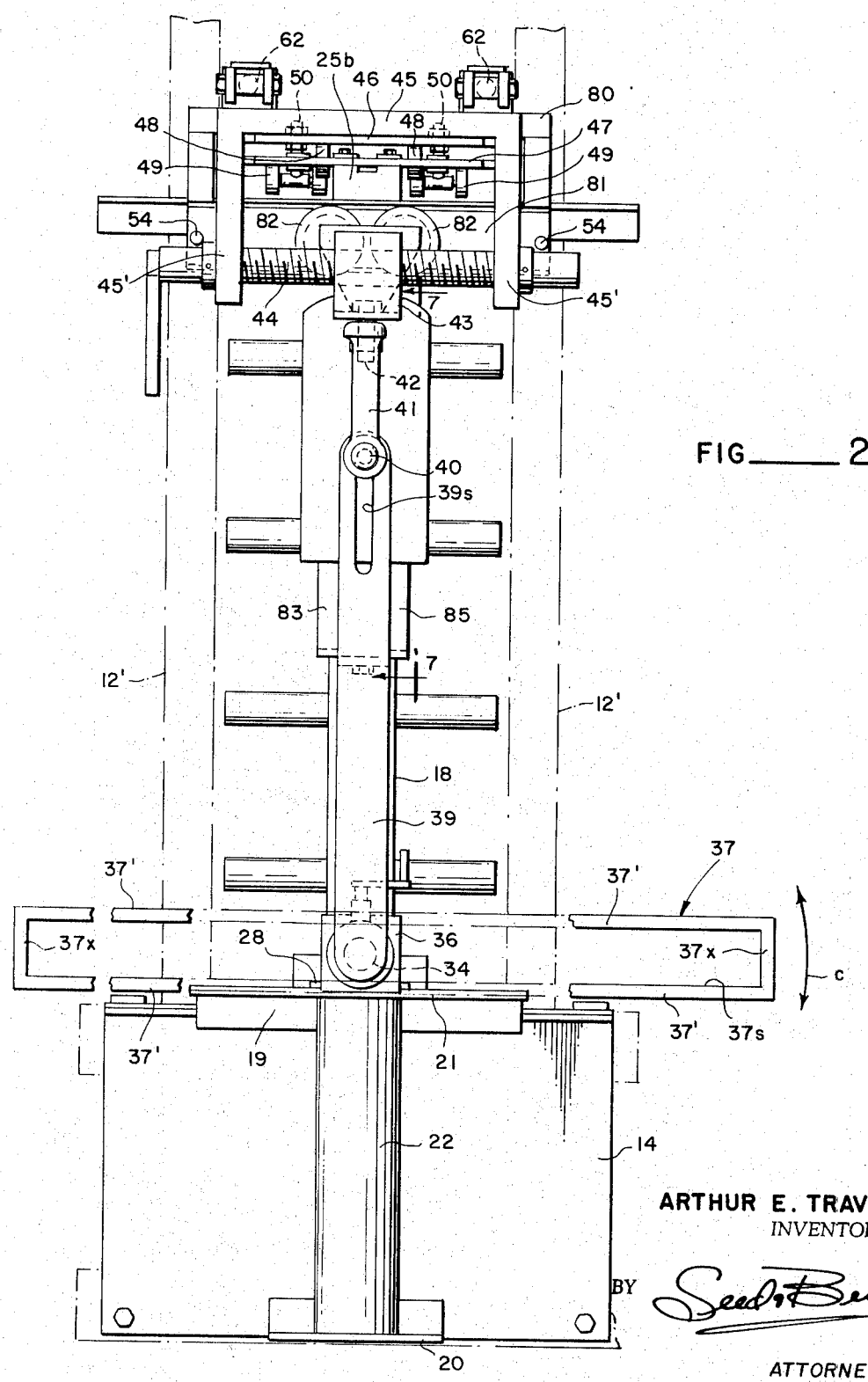
FIG. 2 is a somewhat enlarged, front elevation of the machine of FIG. 1, shown apart from the industrial truck.

Mounted coaxially within the housing 31 and extending forwardly therefrom, as in FIG. 3, is a shaft 34 which terminates at its outer end as a ball 35 by which a block 36 is pivotally mounted. Supported by block 36, see FIGS. 2 and 3, is an angle iron cross-arm 37 provided with a longitudinal slot, substantially to its full length in which, medially of its ends, the block 36 is secured.

The ball equipped shaft 34 is mounted in housing 30, may be adjusted endwise in housing 30 to more or less extent by means of gearing contained in the outer end portion 30x of the housing 30; this gearing being manually operable by a hand crank 38x.

Suspended immediately forward of the block 36 and across arm 37, as shown in FIG. 3, is a housing 38 for mounting the vacuum cup unit, as presently explained. This is shown in FIG. 9 in front elevation to be of octagonal formation and of substantial diameter but it is relatively narrow in front to back thickness, as illustrated in dash lines in FIG. 3.

The housing 38 is normally suspended by means of a hanger link structure 39 shown in FIG. 3 to be attached to a yoke-like means of support 45 presently described, applied across the outer portion of the jib 25b of crane 25. At its lower end, the link 39 is fixed, by a horizontal pivot pin or bolt 39′ to a vertical wall member of housing 38. Centrally thereof, in such manner as to permit the housing 38 to have limited rotary adjustment in opposite direction, about the axis of bolt 39′. At its top end, the link 39 has a longitudinally directed slot 39s, see FIG. 2, through which a horizontal suspending bolt 40 extends for the attachment of the link 39 to the lower end of a clevis 41 which is pivotally suspended from a nut 43 that is threaded, as shown in FIG. 2, on a horizontal transversely directed shaft 44 rotatably secured at its ends in the laterally spaced, downwardly directed legs 45—45 of an inverted yoke 45 that is mounted upon and fixedly secured across the outer edge portion of a horizontal plate 46, that, in turn, is disposed across the outer end portion of a jib 25b, as shown in FIGS. 3 and 4.

It is to be observed by reference to FIGS. 2 and 3, that the plate 46 by which the yoke 45 is directly supported is mounted in a plane parallel with and spaced slightly above a similar plate 47 for limited sidewise adjacent as has been indicated by its dash-line positions in FIG. 5. Plate 47 rests horizontally and directly upon and is bolted to the outer end of the jib 25b. The means of support for plate 46 comprises a pair of transversely aligned rollers 48—48 that are supported at opposite sides of the jib by self-aligning bearings 48′; these rollers being beneath the outer edge portion of plate 46. Near its rear edge, the plate 46 is mounted by paired rollers 49—49 at opposite sides of the jib, as in FIG. 5. Each pair of rollers 49 is mounted by a vertical bolt 50 that is fixed at its upper end in the rear edge portion of plate 46 and extends downwardly and through a rapidly curved slot 51 in the plate 47, as has been illustrated in FIG. 5; the paired rollers being in supporting rolling engagement with the under side of plate 47 as in FIG. 3.

The means for angularly adjusting the plate 47 comprises a pair of threaded adjusting shafts 62—62, see FIG. 4, that are pivotally fixed at their outer ends by pivot bearings 63 extended between horizontal channel bars 64—64 that are fixed at their inner ends to bearings 65—65 mounted between bars 64—64 as mounted on a cross-bar 66 supported on the jib 25b as shown in FIGS. 3 and 4; these shafts 62—62 revolve in their bearings 65—65 and in the supporting cross members 63.

At their inner ends, turning cranks 67 are fixed on shafts 62. Threaded on the shafts are nuts 68—68, each of which has a link 69, see FIG. 6, pivotally connecting it with the corresponding rear edge of the plate 46. Thus, by rotating either shaft 62, the nut 68 thereon will be caused to move outwardly or inwardly therealong and thus effect angular adjustment of the position of plate 46 accordingly.

The vacuum cup unit employed with the present mechanism is best shown as functionally applied in FIG. 9 to be supported by a fabricated cross-bar 70 that is extended horizontally across the forward face of the housing 38 whereon it is fixed by a pair of clamp plates 71—71 that are bolted thereover to opposite edge portions of the housing.

Adjustably mounted on opposite end portions of the cross-bar are cross-arms 72—72 which, at each of their opposite ends mounts a vacuum or suction cup 73 thereon. These cups have flexible tubular connections 74 with a vacuum tank 75 mounted in the housing 38 and in which suitable vacuum is maintained by a suction pump 76 driven by an electric motor 77; these also being mounted in housing 38. The two pairs of cups 73—73 may be symmetrically or otherwise adjustably spaced relative to the housing 38 as indicated in FIG. 9 to best suit the workpiece or panel being handled.

To effect vertical adjustment of the housing 38 and vacuum cup unit that is supported by it, I have provided the housing suspending means shown in FIG. 3, which comprises a horizontal bar 80 of channel formation that is mounted transversely across the medial portion of plate 46, and which, from its opposite ends, supports a horizontal I-beam 81 which extends equally to opposite sides of the jib 25f. Suspended for travel from this beam 81 by means of paired rollers 82—82 that travel on the beam flanges at each side of the beam as shown in FIG. 2 is a hanger made up of a pair of plates 83—83 that are joined in parallel spaced relationship at opposite edges by cross-bars 84.

Mounted for vertical sliding movement between the plates 83—83 and the plate joining cross bars 84, as in FIG. 10, is a rectangular loop forming carrier frame 85. It is also to be noted that a horizontal plate 86 is fixed between the lower ends of plates 83—83. This plate 86 serves as a mounting base for a manually operated hydraulic jack 87 which has its piston rod 87′ extended upwardly therefrom into engagement with the upper end member 83x of the frame 85 as in FIG. 10. The lower end member 83a of the loop frame 85 is bolted to a bracket 88 fixed to the inside face of hanger bar 39, as shown in FIG. 3. Thus, by the extending of the jack piston, the frame 85 will be lifted, to lift the link 39 and the housing 38 accordingly. The housing 38 may be likewise lowered by the jack 87 to the extent permitted by the slot 39s in link 39.

Assuming that the parts in combination as so far described have been mounted on the carrier truck 10 as illustrated in FIGS. 1 and 9, the use of the mechanism, for the removing of a glass pane or panel from a window frame would ordinarily be as follows:

First, the truck 10 equipped as in FIG. 1, is driven to a position closely in front of the glass pane. In this view, the window opening is designated at *o* and the frame by reference *f*. Normally, the position of the truck 10 remains in its original setting or position of FIG. 1 relative to the frame *t*.

The vacuum cups 73 are then adjusted to laterally spacing on cross bar 70 that best suits the size of the window pane to be handled, and also are adjusted to the most advantageous elevation by the jack 87 for the pick-up. Then the housing 38, carrying the vacuum cups is moved forwardly by extending the shaft 34 by manipulation of crank 38x to place the lower vacuum cups in contact with the glass pane. When it is desired to engage all cups with the pane, the support is caused to be leaned outwardly by tilting the mast forwardly and when all are engaged, vacuum is applied to the cups under valve control to cause them to hold the pane secure. Then, by causing a slight lifting of the cup supporting housing 38 through the mediacy of jack 87, the glass will be lifted free from its frame opening. Then, by backing the truck away from the frame, the pane will be cleared from the frame opening for carrying to any place of disposal.

For placing a pane of glass, when held by the vacuum cups, in a frame opening, it is usual that the pane is carried by the truck to a point immediately in front of the frame opening as has been shown in FIG. 1. The pane holding vacuum unit is caused to be adjusted by vertical adjustment of the housing 38 to proper elevation by use of jack 87. It may also be moved into proper position for seating the lower edge of the pane on the lower edge of the frame. This lateral adjustment is effected by turning of the shaft 45 to adjust the nut 43 from which the housing 38 is suspended to one side or the other.

Proper alignment of the panel with the frame is effected by selectively adjusting the shafts 62—62 to angularly adjust the plate 46, by which the yoke 45 is supported to one side of the other.

Panes of glass, as designated for application to store front openings, may be lifted by the means shown in FIG. 1, from one floor level to a higher floor level, when a mast 12 of extended construction is used. However, the mode of operation remains the same.

The best methods to be employed for glass panel setting depends on the particular requirements and conditions, and may be varied to meet conditions.

The features of this device that are most important are those that provide for the adjustment of the vacuum cup carrier means to obtain shifting, lifting or lowering; forward or rearward tilting, and angular positioning of the supported pane or panel for its placement in a frame opening and for its securement while the pane securing strips are being applied to the frame.

The kind of industrial truck employed is immaterial so long as it may be controlled for travel and has a lift mechanism that is comparable to that herein disclosed.

What I claim as new is:

1. An attachment for a mobile vehicle with an upright mast mounted on said vehicle with means for tilting said mast about a horizontal axis, a carriage mounted on said mast, and means for vertically moving said carriage along said mast, said attachment comprising: a support structure mountable on said carriage; a jib structure; means pivotally mounting said jib structure on said support structure for movement about a vertical axis; a horizontal track forming beam mounted transversely of the jib structure on the outer end thereof; a substantially vertically disposed load gripping device; a substantially vertical support means for mounting said load gripping device on said jib structure and track forming beam; means on said vertical support means to move said load gripping device vertically relative to said jib structure; further means on said vertical support means to move said load gripping device along said track forming beam; means on said jib structure to horizontally slew said load gripping device relative to said jib structure; and means on said support structure to swing said load gripping device in a vertical plane relative to said jib structure.

2. A glass pane handling device, for attachment to a mobile vehicle having an upright mast mounted for forward or rearward tilting adjustment and a lift platform mounted for up and down adjustment along the mast, which comprises: pane supporting means for supporting a panel of glass comprising a housing, a cross-arm fixed to said housing and extended horizontally thereacross, suction cups mounted on opposite end portions of said crossarm that are positioned and faced for their direct functional applications to a glass panel; a jib crane having a forwardly extending jib and mountable on said lift platform for controlled lateral swinging adjustment of the jib toward either side of the supporting vehicle and for elevational adjustment of said housing by controlled tilting adjustment of mast; support means suspending said pane supporting means from the crane jib including a track-forming beam supported transversely of said crane jib at its outer end, said housing and cross-arm being suspended from the trackway by rollers that are adjustably movable therealong and an hydraulic jack operable to raise or lower the housing and the cross-arm; means adjustably supported from the crane whereby the suspended housing may be moved forwardly or retracted, a plate horizontally mounted on the crane jib across its outer end, and a second plate supported on and in a plane parallel with the first plate, said track forming beam being mounted upon and transversely of the second mentioned plate, and said housing and its cross-arm being suspended from the trackway from rollers that are mounted for travel along the trackway.

3. Apparatus according to claim 2 including an inverted U-shaped yoke mounted across the outer end portion of said second plate, a threaded shaft rotatably mounted by and between the downwardly directed arms of said yoke, a nut threaded on the shaft between said yoke arms, a downwardly directed link suspended from said nut and connected with the supporting means for said housing and cross-arm, for their lateral adjustment by said crossshaft and nut assemblage.

4. Apparatus according to claim 3 wherein the crane jib mounts a plate adjusting means thereon inwardly from said plates as mounted on the outer end portion of the jib and operable for selective lateral pivotal movement of the second plate toward either side for effecting lateral movement of the housing and the plate carrying arm as mounted thereon.

5. Apparatus according to claim 4 wherein said means adapted to shift said pane supporting means toward and away from said mast is mounted on and for elevational adjustment with the lift platform and connected with said housing for moving the housing inwardly or outwardly relative to the mast.

6. Apparatus according to claim 4, including adjusting means mounted on and for elevational adjustment with the lift plate and connected with said housing for moving the housing inwardly or outwardly relative to the mast, said adjusting means having pivotal connection at its outer end with said housing and is mounted at its inner end for radial swinging adjustment about the crane mounting.

7. A device according to claim 6 wherein the support means for suspending the pane supporting means includes a first plate horizontally mounted across the outer end of said crane jib, a second plate supported on and in a plane parallel with the first plate, and a track forming beam mounted on and transversely of the second plate, the pane supporting means being suspended from the trackway from rollers mounted for travel along the trackway.

References Cited

UNITED STATES PATENTS

| | | | |
|---|---|---|---|
| 2,699,879 | 1/1955 | Bertram | 214—653 |
| 2,878,622 | 3/1959 | Insolio. | |
| 2,899,088 | 8/1959 | Corbin. | |
| 2,980,269 | 4/1961 | Zimmerman | 214—75 |
| 2,990,074 | 6/1961 | Berquist et al. | 214—730 X |
| 3,115,262 | 12/1963 | Avery. | |
| 3,207,348 | 9/1965 | Olson. | |

FOREIGN PATENTS 1,316,425   12/1962   France.

GERALD M. FORLENZA, *Primary Examiner.*

HUGO O. SCHULZ, *Examiner.*

R. B. JOHNSON, *Assistant Examiner.*